Oct. 23, 1945.     T. S. LINDABURY     2,387,520
FAIRLEADER
Filed April 12, 1943
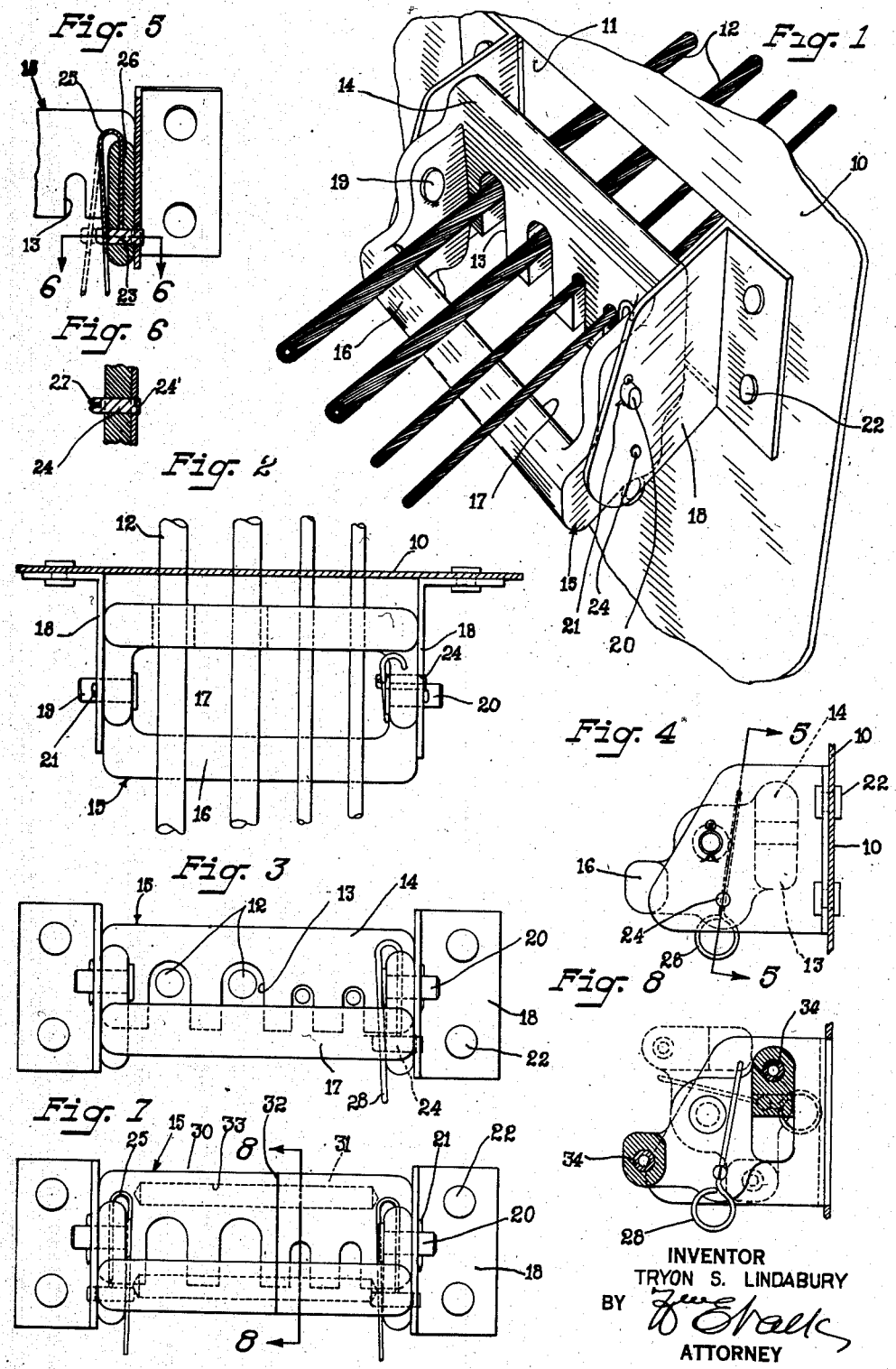
INVENTOR
TRYON S. LINDABURY
BY
ATTORNEY Patented Oct. 23, 1945

2,387,520

UNITED STATES PATENT OFFICE 2,387,520

FAIR-LEADER

Tryon S. Lindabury, University City, Mo., assignor to Curtiss-Wright Corporation, a corporation of Delaware Application April 12, 1943, Serial No. 482,828

13 Claims. (Cl. 254—190)

This invention relates to fairleaders or cable guides of a type particularly adaptable for use in aircraft.

With the types of fairleaders used heretofore, it has been necessary to completely disassemble the fairleader in order to extend the cable with its fittings therethrough. Such fairleaders have been generally of split or separable wooden members notched to receive the cable. These wooden members were generally held together to the frame of the aircraft by screws and in order that the cable fitting as well as the cable could be extended through them, it necessitated the complete removal and separating of these wooden parts and their realignment on the aircraft frame.

It is, therefore, an object of the present invention to provide a fairleader or cable guide which need not be disassembled or detached from the aircraft upon the cable being connected to or removed from the aircraft.

It is another object of the invention to provide a cable guide arrangement wherein the cable fittings in the cables can be threaded through the same.

It is still another object of the invention to provide a fairleader of this type which is adapted to simultaneously handle a plurality of cables.

According to the present invention, there has been provided a guiding element having a portion with slots therein adapted to receive the cables and a supporting portion adapted to automatically come into play to support the cables in the slots of the guiding portion upon the same being adjusted and retained in the guiding position. This supporting portion is located in advance of the cable guiding portion so as to provide an enlarged opening therebetween which, when the guiding element is rotated or adjusted to a position in axial alignment with the cables, will easily permit the cable fitting to be either threaded through the guiding element or freed of the same.

This fairleader or cable guide is adapted for attachment to a vertically extending frame member having an opening therethrough and serving as a part of the frame structure of the aircraft. It can be located either in the top or sides of the airplane body or in the bottom thereof. The cables in passing through the guiding element also can be angled upon leaving the same. Also the guiding element can be made in two sections to permit the disassembly of the guiding element itself, whereby it can be freed entirely of the cables without requiring disconnection of the cables themselves.

For other objects and for a better understanding of the invention, reference may be had to the following detail description taken in connection with the accompanying drawing, in which Fig. 1 is a perspective view of the fairleader or cable guide of the present invention, showing its attachment to an aircraft frame and illustrating the manner in which the cables are extended therethrough.

Fig. 2 is a plan view of the fairleader.

Fig. 3 is a front view, in elevation, of the fairleader and its mounting means.

Fig. 4 is an end view, in elevation, of the same.

Fig. 5 is a detail view, partly in cross section, taken along the line 5—5 of Fig. 4, and showing particularly the arrangement of the detent mechanism.

Fig. 6 is also a detail view of the detent element itself and taken along the line 6—6 of Fig. 5.

Fig. 7 is a front view, in elevation, of a modified form of the invention, the guiding element being adapted to be separated for complete disassembly of the guiding element from the cables.

Fig. 8 is a detail view of the modified form, in cross section, taken along the line 8—8 of Fig. 7.

Referring now to the figures, there is shown a frame 10 which may be a fire wall or other frame element forming a part of the aircraft body. This frame element 10 has an opening 11 through which a plurality of cables 12 extend. These cables, upon leaving the opening 11, extend through open ended guide slots 13 in a guide portion 14 of an adjustable guiding element 15 and are supported in these slots 13 by a supporting portion 16 located in advance of the guiding portion 14 to provide an enlarged opening 17. With the cable elements 12 resting on the supporting portion 16, the cables 12 are retained in the upper parts of the slots 13. In order to make this effective, the guiding element 15 is pivotally adjusted to locate the slots over the cables 12.

The guiding element itself is retained by brackets 18 in such a manner as to be pivotal with respect thereto and to lie astraddle of the opening 11 of the frame 10. The guiding element has removable trunnion pins 19 and 20 which are held respectively in place by cotter pins 21. The brackets are secured to the frame 10 by fastening bolts 22.

In order to retain the guiding element in its guiding position, there is provided a detent mechanism 23 including a detent pin 24 and a hairpin-shaped spring 25. This hairpin spring has one leg extending in an opening 26 and is retained therein by its frictional engagement with the wall thereof. The other leg of the hairpin spring extends downwardly and parallel to the side of the guiding element and is fastened to the pin 24, see Figs. 5 and 6. This fastening is accomplished by the bending over the portions of the pin about the spring 25 in a manner as indicated at 27 in Fig. 6. On the lower end of the spring 25, there is a ring portion 28 serving as a handle which is depressed to effect the displacement of the detent pin 24 against the action of the spring 25. The pin 24 is carried in a hole in the guiding element and when the guiding element is adjusted to be disposed in the guiding position the pin 24 registers with a hole 24' in the bracket 18. When it is desired to position the guiding element 15 for removal of the cables, this may be accomplished by withdrawing the detent 24 from the hole 24' and rotating the guiding element in a counterclockwise direction to free the cables 12 of their slots 13, at the same time positioning the enlarged opening 17 in a plane normal to the extent of the cables and such that cable fittings can be readily threaded through the guiding element. While the guiding slots 13 are not of sufficient dimensions to permit the passage of cable fittings therethrough, the enlarged opening 17 is of such dimension as to readily permit the passing therethrough of the cable fittings. Once the new cable has been inserted in the guiding element or an old one removed, the guiding element can be readily returned to its guiding position and there again retained by the detent 24. It means simply giving to the guiding element a rotational movement to fit the slots 13 over the cables 12. The slots 13 are generally over size so that the cable can fit loosely through them. Perhaps the only contact of the cable with either the slot or the supporting portion 16 may be only at such time as the cables are flexed, due to some sudden shock to the aircraft. It is most probable the majority of the wear would be on the cable supporting portion 16. With this guiding element made of soft plastic material and of less hardness than the steel in the cables themselves, little or no wear should at any time be put on the cables.

Referring now particularly to Figs. 7 and 8, there is shown a modified form of the guiding element. There is shown such an element which can be separated at times when it is desired to completely remove the guiding element from the brackets 18 and from the cables without unfastening the ends of the cables 12. In this form of the invention, the guiding element comprises two sections 30 and 31 joined together at the parting line as indicated at 32. Extending through these sections and respectively through the guiding and supporting portions thereof, are openings 33 adapted to receive respectively pins 34. The trunnion pins 19 and 20 are removable from the guiding element 15 after first removing the cotter pins 21. By removing both of these trunnions, the guiding element can be slid along the extent of the cables and removed from the brackets 18. Once the guide element is free of the brackets 18, it can be rotated so as to locate the cables 12 in the enlarged opening 17 and then the sections 30 and 31 may be separated by sliding either section away from the other until it is clear of the pins 34. Preferably with this form of invention, there is provided detent mechanisms 23 at each side of the guiding element.

It should now be apparent that there has been provided a fairleader or cable guide which is adjustable so as to serve to guide the cables when in one position and when in another position, such as to permit the threading therethrough of the cable fittings, all of which being possible without the necessity of actually disconnecting the guiding element from the frame of the aircraft.

It should also be apparent that the fairleader can be used in the reversed or upside down position as well as in the position shown in the drawing, so that the slotted or guiding portion 14 supports the cables 12 while the supporting portion 16 becomes merely a restraining means to confine the cables within the slots. Also that the fairleader can be used on the side walls of an airplane body in an angled position with the horizontal.

While various changes may be made in the detail construction it shall be understood that such changes shall be within the spirit and scope of the present invention as defined by the appended claims.

I claim as my invention:

1. A guide for a cable with which a fitting is to be associated, said guide including a member having spaced-apart guide portions which extend transversely of said cable and between which the latter passes, pivot forming means for normally supporting said member in an angular position such that, without interfering with substantially free longitudinal movement of said cable, one of said guide portions is engageable with one section of said cable to limit lateral movement of the latter in one direction and another of said guide portions is engageable with a different section of said cable to limit its lateral movement in the opposite direction, and releasable means to secure said member in said angular position, but upon release to permit pivotal movement of said guide portions away from those sections of said cable with which they are normally engageable toward a plane normal to the plane of said cable to thereby provide suitable clearance for the passage of said fitting between said guide portions.

2. A guide for a cable with which a fitting is to be associated, said guide including a member having spaced-apart guide portions which extend transversely of said cable and between which the latter passes, means for pivotally supporting said member for adjustment from an angular position such that, without interfering with substantially free longitudinal movement of said cable, one of said guide portions is engageable with one section of said cable to limit lateral movement of the latter in one direction and another of said guide portions is engageable with a different section of said cable to limit its lateral movement in the opposite direction, to an angular position whereby to move said guide portions away from those sections of said cable with which they are normally engageable toward a plane normal to the plane of said cable to thereby provide suitable clearance for the passage of said fitting between said guide portions, and means for releasably securing said member in said first mentioned position.

3. A guide for a cable with which a fitting is to be associated, said guide including a member having spaced-apart guide portions which extend transversely of said cable, between which the latter passes and one of which is formed with an open-ended slot, and means for normally supporting said member in an angular position such that, without interfering with substantially free longitudinal movement of said cable, said slot accommodates one section of said cable while another of said guide portions is engageable with a different section of said cable to hold the latter in said slot, said member being adjustable with respect to said supporting means to move said guide portions, including the portion in which said slot is formed, away from those sections of said cable with which they are normally engageable toward a plane normal to the plane of said cable to thereby provide suitable clearance for the passage of said fitting between said guide portions.

4. A guide for a cable with which a fitting is to be associated including a member having spaced-apart guide portions which delimit an opening through which said cable extends and one of which is formed with an open-ended slot which communicates with said opening, means for pivotally supporting said member in an angular position such that, without interfering with substantially free longitudinal movement of said cable, said slot accommodates one section of said cable while another of said guide portions is engageable with a different section of said cable to hold the latter in said slot, said member being angularly adjustable about said means to move said guide portions, including the portion in which said slot is formed, away from those sections of said cable with which they are normally engageable toward a plane normal to the plane of said cable, whereby to provide suitable clearance for the passage of said fitting between said guide portions, and means for releasably securing said member in said first mentioned position.

5. A guide for a plurality of cables with which fittings are to be associated, said guide including a member having spaced-apart guide portions which delimit an opening through which said cables extend and one of which is formed with a plurality of open-ended slots which communicate with said opening, means for pivotally supporting said member in an angular position such that, without interfering with substantially free longitudinal movement of said cables, one of said slots accommodates one section of each of said cables while another of said guide portions is engageable with a different section of each of said cables to hold the latter in said slots, said member being adjustable to move said guide portions, including the portion in which said slots are formed, away from those sections of said cable with which they are normally engageable toward a plane normal to the plane of said cables, whereby to provide suitable clearance for the passage of said fittings between said guide portions, and means for releasably securing said member in said first mentioned position.

6. In a guide for a cable, a member having spaced-apart guide portions which delimit an enlarged opening through which said cable extends and one of which is formed with an open-ended slot which communicates with said opening, and means for adjustably mounting said member, whereby it may be moved either to a position in which said cable occupies said slot so that the walls thereof serve as a guide, or if the cable occupies said slot, to a position in which the cable occupies said opening and is clear of the walls of said slot.

7. In a guide for a cable, a member having spaced-apart guide portions which delimit an enlarged opening through which said cable extends and one of which is formed with an open-ended slot which communicates with said opening, and means for movably mounting said member, for adjustment either to a position in which said cable occupies said slot so that the walls thereof serve as a guide, or if occupying said slot, to a position in which the cable occupies said opening and is clear of the walls of said slot, another of said guide portions being engageable with said cable to hold it in said slot when said member occupies said first mentioned position.

8. In a guide for a cable, a member having spaced-apart guide portions which delimit an enlarged opening through which said cable extends and one of which is formed with an open-ended slot which communicates with said opening, and means for pivotally mounting said member, whereby it may be angularly adjusted either to a position in which said cable occupies said slot so that the walls thereof serve as a guide, or if occupying said slot, to a position in which the cable occupies said opening and is clear of the walls of said slot.

9. In a guide for a cable, a member having spaced-apart guide portions which delimit an enlarged opening through which said cable extends and one of which is formed with an open-ended slot which communicates with said opening, means for pivotally mounting said member, whereby it may be angularly adjusted either to a position in which said cable occupies said slot so that the wall thereof serves as a guide, or if occupying said slot, to a position in which the cable occupies said opening and is clear of the walls of said slot, and means for releasably securing said member in said first mentioned position.

10. In a guide for a cable, a member having spaced-apart guide portions which delimit an enlarged opening through which said cable extends and one of which is formed with an open-ended slot which communicates with said opening, the plane of said slot being substantially normal to the plane of said opening, and means for pivotally mounting said member, whereby it may be angularly adjusted either to a position in which said cable occupies said slot so that the walls thereof serve as a guide, or if occupying said slot, to a position in which the cable occupies said opening and is clear of the walls of said slot.

11. In a guide for a cable, a member having spaced-apart guide portions which delimit an enlarged opening through which said cable extends and one of which is formed with an open-ended slot which communicates with said opening, the plane of said slot being substantially normal to the plane of said opening, means for pivotally mounting said member, for angular adjustment either to a position in which said cable occupies said slot so that the walls thereof serve as a guide, or if occupying said slot, to a position in which the cable occupies said opening and is clear of the walls of said slot, and means for releasably securing said member in said first mentioned position, another of said guide portions being engageable with said cable to hold it in said slot when said member occupies said first mentioned position.

12. A guide for a cable with which a fitting is to be associated, said guide including a sectional member having spaced-apart guide portions which extend transversely of said cable and between which the latter passes, and pivot means for normally supporting said member in an angular position such that, without interfering with substantially free longitudinal movement of said cable, one of said guide portions is engageable with one section of said cable to limit lateral movement of the latter in one direction and another of said guide portions is engageable with a different section of said cable to limit its lateral movement in the opposite direction, said member being adjustable about said pivot means to permit movement of said guide portions away from those sections of said cable with which they are normally engageable toward a plane normal to the plane of the cable, whereby to provide suitable clearance for the passage of said fitting between said guide portions, the sections of said member being separable to permit the latter to be wholly removed from said cable.

13. In a guide for a cable, a sectional member having formed on each section cooperating spaced-apart guide portions which, when in assembly, together delimit an enlarged opening through which said cable extends and one of which is formed with an open-ended slot which communicates with said opening, and means for adjustably mounting said member, whereby it may be moved either to a position in which said cable occupies said slot so that the walls thereof serve as a guide, or if occupying said slot, to a position in which the cable occupies said opening and is clear of the walls of said slot, the sections of said member being separable to permit the latter to be wholly removed from said cable.

TRYON S. LINDABURY.